United States Patent
Wu

(10) Patent No.: US 9,883,537 B2
(45) Date of Patent: Jan. 30, 2018

(54) METHOD AND SYSTEM FOR SELF-ADAPTIVE PAIRING COMMUNICATION BETWEEN INTELLIGENT DEVICES

(71) Applicant: SHENZHEN SKYWORTH-RGB ELECTRONIC CO., LTD, Shenzhen (CN)

(72) Inventor: Zhiqun Wu, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 0 days.

(21) Appl. No.: 15/122,976

(22) PCT Filed: Mar. 13, 2015

(86) PCT No.: PCT/CN2015/074234
§ 371 (c)(1),
(2) Date: Sep. 1, 2016

(87) PCT Pub. No.: WO2016/106977
PCT Pub. Date: Jul. 7, 2016

(65) Prior Publication Data
US 2017/0079074 A1 Mar. 16, 2017

(30) Foreign Application Priority Data
Dec. 31, 2014 (CN) .......................... 2014 1 0846296

(51) Int. Cl.
*H04W 76/02* (2009.01)
*H04W 4/00* (2009.01)
*H04W 84/18* (2009.01)

(52) U.S. Cl.
CPC ........... *H04W 76/02* (2013.01); *H04W 4/008* (2013.01); *H04W 84/18* (2013.01)

(58) Field of Classification Search
CPC ...... H04W 76/02; H04W 4/008; H04W 84/18
See application file for complete search history.

(56) References Cited

U.S. PATENT DOCUMENTS 7,859,560 B1 * 12/2010 Issa ..................... H04L 12/1827
348/14.01
2012/0054852 A1 * 3/2012 Gibbs ................... H04L 63/164
726/15

(Continued)

FOREIGN PATENT DOCUMENTS

CN 103368925 A 10/2013
CN 103973762 A 8/2014

(Continued)

OTHER PUBLICATIONS

The World Intellectual Property Organization (WIPO) International Search Report for PCT/CN2015/074234 dated Sep. 24, 2016 pp. 1-5.

*Primary Examiner* — Jenee Holland
(74) *Attorney, Agent, or Firm* — Anova Law Group, PLLC

(57) ABSTRACT

Disclosed are a method and system for self-adaptive pairing communication between intelligent devices. The method comprises: sequentially connect all the intelligent devices into a network to establish network connections, and construct a virtual network; after being connected into the network, all the intelligent devices transmit respective role information and data processing characteristic information to one another and store the received information, till the mutual transmission of the corresponding role information and data processing characteristic information of all the intelligent devices is completed; and when a first intelligent device needs to carry out transmission of control information and data information with another intelligent device, the first intelligent device carries out data exchange with the (Continued)

other intelligent devices matching the first intelligent device according to the information of the first intelligent device and the stored information of all the intelligent devices. According to the present invention, a bridge can be set up rapidly, simply and efficiently between the intelligent devices, all the intelligent devices can be paired in a self-adaptive mode, interconnection and interaction can be achieved, the operation is simple, the method and system are easy to implement, and great convenience is brought to users.

15 Claims, 3 Drawing Sheets

(56) References Cited

U.S. PATENT DOCUMENTS

| | | | | |
|---|---|---|---|---|
| 2012/0088524 | A1* | 4/2012 | Moldavsky | G06Q 30/02 455/456.3 |
| 2014/0169599 | A1* | 6/2014 | Solum | H04R 25/554 381/315 |
| 2014/0244829 | A1* | 8/2014 | Ortega-Binderberger | H04L 43/0805 709/224 |

FOREIGN PATENT DOCUMENTS

| | | |
|---|---|---|
| CN | 104244047 A | 12/2014 |
| WO | 2013131497 A1 | 9/2013 |

* cited by examiner

METHOD AND SYSTEM FOR SELF-ADAPTIVE PAIRING COMMUNICATION BETWEEN INTELLIGENT DEVICES

CROSS-REFERENCES TO RELATED APPLICATIONS

This application is a national stage application of PCT Patent Application No. PCT/CN2015/074234, filed on Mar. 13, 2015, which claims priority to Chinese Patent Application No. 201410846296.9, filed on Dec. 31, 2014, the content of all of which is incorporated herein by reference.

FIELD OF THE INVENTION

The present invention relates to the field of Internet/consumer electronic, and more particularly, to a method and system for self-adaptive pairing communication between intelligent devices.

BACKGROUND

Now more and more intelligent devices are used at home, and their usages are also wider and wider, these intelligent devices may achieve a purpose of working together, through a plurality of configurations, for example, through a target address configuration, a plurality of pictures in a camcorder may be transmitted to a TV, or a song playing in a cell phone may be transmitted to a stereo to play.

These devices themselves are very smart, and owing a rich plurality of data processing abilities. However, in fact, between devices, they are still unknown to each other, which is reflected in a mutual recognition between devices. For example: a TV may play a plurality of videos and pictures, but the TV itself does not know which device has those videos and pictures to play, which means, a TV does not know which device has an ability of providing videos and pictures. It requires a manual recognition for possible collaborations between different devices, which has increased a mutual complexity between different devices, as well as limiting an excellent performance for a function of a device, reducing an efficiency of collaborations between devices.

Therefore, the current technology needs to be improved and developed.

BRIEF SUMMARY OF THE DISCLOSURE

According to the above described defects, the purpose of the present invention is providing a method and system for self-adaptive pairing communication between intelligent devices. The present invention may achieve setting up a bridge between each intelligent device in a rapid and simple way with a high efficiency, and each intelligent device is able to be paired in a self-adaptive way, interconnection and interaction may be achieved. Also, it owns a simple operation and it is easy to implement, which has brought great convenience to users.

In order to achieve the above mentioned goals, the technical solution of the present invention to solve the technical problems is as follows:

A method for self-adaptive pairing communication between intelligent devices, wherein, it comprises:

A, establishing a network connection by sequentially connecting all intelligent devices into a network, and constructing a virtual network;

B, when each intelligent device is connected into a network, both information are transmitted to each other and saved by each other, including both respective role information and data processing characteristic information of all the intelligent devices; when all the mutual transmissions of the corresponding role information and data processing characteristic information of all intelligent devices are completed, go directly to step C;

C, when a first intelligent device needs to carry out transmission of both control information and data information with another intelligent device, the first intelligent device carries out data exchange with the other intelligent devices matching the first intelligent device, according to the information of both the first intelligent device itself and the stored information of each intelligent device.

The said method for self-adaptive pairing communication between intelligent devices, wherein, the said step B further comprises:

B1. when a first intelligent device goes online for work, it sends the according role information and data processing characteristic information corresponding to itself to those neighbor intelligent devices locating at the neighbor nodes of the said first intelligent device;

B2. the neighbor intelligent devices locating at the neighbor nodes of the said first intelligent device save the according role information and data processing characteristic information corresponding to the first intelligent device; before transmitting to the intelligent devices at other neighbor nodes in a second time; and repeat once again, until reaches the whole network, thus the mutual transmission of both role information and data processing characteristic information corresponding to all intelligent devices are completed.

The said method for self-adaptive pairing communication between intelligent devices, wherein, the said role information in the step B comprises: a role of Capture, applied to providing data source, and a role of Player, applied to processing and consuming data;

wherein, the said intelligent device supports more than one communication protocols of IP, Bluetooth and ZIGBEE.

The said method for self-adaptive pairing communication between intelligent devices, wherein, the said step B1 comprises specifically:

B11, when a first intelligent device goes online for work, it sends two kinds of messages to its neighbor intelligent devices locating at the neighbor nodes of the said first intelligent device: one is the role information, applied to notifying its neighbor nodes that it is a role of Capture or a role of Player; the other is the data processing characteristic information, which changes following the changes of roles;

B12. when the said first intelligent device is acting as a role of Capture, applied to providing data source, it sends a data processing characteristic information to the neighbor intelligent devices at neighbor nodes, including a data source for data formats and a data requesting condition;

when the said first intelligent device is acting as a role of Player, applied to processing and consuming data, it sends a data processing characteristic information to the neighbor intelligent devices at neighbor nodes, including a request of data source formats and a data processing method.

The said method for self-adaptive pairing communication between intelligent devices, wherein, the said step B2 comprises specifically:

B21. The neighbor nodes of the said first intelligent device obtain the corresponding role information and the data processing characteristic information before storing;

B22. at the same time, transferring to other neighbor nodes both the role information and the data processing characteristic information corresponding to the first intelligent device, executing a second transmitting to the intelligent devices at other neighbor nodes, and all nodes receiving these information will store the information;

B23. repeating sequentially until reaching the whole network, then completing the mutual transmission of both role information and data processing characteristic information corresponding to all intelligent devices.

The said method for self-adaptive pairing communication between intelligent devices, wherein, the said step C comprises specifically:

C11. when an intelligent device acting as a role of Capture is actively providing data, it sends a request to devices at its neighbor nodes asking who may use the data;

C12, if the neighbor nodes have stored the information on intelligent device acting as a role of Player and matches this related data, then they send these related information of intelligent devices acting as a role of Player to those acting as a role of Capture; the intelligent devices acting as a role of Capture use these information to negotiate with those intelligent devices acting as a role of Player, and send out a data supplying application;

C13, when the intelligent device at the neighbor node has not found the related information on the intelligent device acting as a role of Player, it continues sending request messages to other neighbor nodes, up to all nodes;

C14, the intelligent device acting as a role of Capture will send a data supplying notice to that acting as a role of Player, and continue data sending; while the intelligent device acting as a role of Player will process the data according to its data processing actions.

The said method for self-adaptive pairing communication between intelligent devices, wherein, the said step C further comprises specifically:

C21, when the intelligent device acting as a role of Player is actively using data in a specific format, it sends out requests to those intelligent devices at neighbor nodes, asking who has the data in the specific format;

C22, if an intelligent device at a neighbor node has the information stored on the intelligent device acting as a role of Capture and matching this related data, then it sends the related information of the intelligent device acting as a role of Capture to the intelligent device acting as a role of Player;

C23, the intelligent device acting as a role of Player uses the information of the intelligent device acting as a role of Capture related to the data in the said specific format to negotiate with the intelligent device acting as a role of Capture, and sends out data request application;

C24, the intelligent device acting as a role of Player will send the intelligent device acting as a role of Capture the data request as well as a proof requested by the intelligent device acting as a role of Capture, which will be processed after data received.

A self-adaptive paring communication system between intelligent devices, wherein, it comprises:

a connection and processing module, applied to sequentially connecting each intelligent device into a network and setting up a network connection, before building up a virtue network;

a network control module, applied to mutually transmitting the respective roles information and data processing characteristic information before saving, when each intelligent device is connected into the network, until the mutual transmission of both the role information and the data processing characteristic information corresponding to all the intelligent devices is completed;

a data processing control module, applied to controlling the first intelligent device execute data exchanges with other intelligent devices matching the first intelligent device according to its own information and the stored information on each intelligent device, when the said first intelligent device needs to transmit both controlling information and data information with another intelligent device;

a transmission control module, applied to controlling sending both the corresponding role information and data processing characteristic information to the neighbor intelligent devices at the neighbor nodes of the said first intelligent device;

a forward control module, applied to controlling the neighbor intelligent devices at the neighbor nodes of the said first intelligent device store both the role information and the data processing characteristic information corresponding to the said first intelligent device; and transmit in a second time to the intelligent devices of other neighbor nodes; and repeat until reaching the whole network, then it completes the mutual transmission of both the role information and the data processing characteristic information corresponding to all the intelligent devices.

The said self-adaptive paring communication system between intelligent devices, wherein, the said sending control module comprises:

a first sending unit, applied to sending two kinds of messages to the neighbor intelligent devices locating at the neighbor nodes of the said first intelligent device, when a first intelligent device goes online for work: one is a role information, applied to notifying its neighbor nodes that it is a role of Capture or a role of Player; the other is a data processing characteristic information, which changes according to role changes;

a second sending unit, applied to sending a data processing characteristic information to the neighbor intelligent devices at neighbor nodes, including a data source for data formats and a data requesting condition, when the said first intelligent device is acting as a role of Capture, applied to providing data source; and when the said first intelligent device is acting as a role of Player, applied to processing and consuming data, it sends out a data processing characteristic information to its neighbor intelligent devices at neighbor nodes, including a request on data source formats and a data processing method;

the said forward control module includes specifically:

an obtaining and storage unit, applied for the neighbor nodes of the said first intelligent device to obtaining the role information and data processing characteristic information corresponding to the said first intelligent device before storing;

a transmission control unit, applied to transmitting the role information and data processing characteristic information corresponding to the said first intelligent device to the intelligent devices at other neighbor nodes, or a second propagation to the intelligent devices at other neighbor nodes, while all nodes receiving these information will store the information; and it is repeating sequentially, until reaching the while network, and finally completing the mutual transmission of both role information and data processing characteristic information corresponding to all intelligent devices;

the said intelligent devices support at least one of the transmission agreements including IP. Bluetooth, ZIGBEE;

the said role information includes: a role of Capture, applied to providing data source, and a role of Player, applied to processing and consuming data.

The said self-adaptive paring communication system between intelligent devices, wherein, the said data processing control module comprises specifically:

a first request control unit, applied to sending requests to devices at neighbor nodes asking whom may use this kind of data, when an intelligent device acting as a role of Capture is preparing to actively provide the data;

a first matching control unit, applied to sending the related information of the intelligent device acting as a role of Player to those acting as a role of Capture, when the neighbor nodes have the intelligent device information stored, which acts as a role of Player and matches these related data; and the intelligent devices acting as a role of Capture use these information to negotiate with those intelligent devices acting as a role of Player, and send out the data supplying application;

a second request control unit, applied to controlling the intelligent devices at neighbor nodes continue sending request messages to other neighbor nodes up to all nodes, if there is no intelligent device related information found acting as a role of Player;

a notice sending control unit, applied to controlling the intelligent device acting as a role of Capture send data supplying notice to that acting as a role of Player and continue data sending; while the intelligent device acting as a role of Player processes data based on its own data processing actions;

a third request control unit, applied for the intelligent device acting as a role of Player to sending a request to intelligent devices at its neighbor nodes, asking whom having the data in the specific format, when the intelligent device acting as a role of Player is preparing to actively use a specific format of data;

a first matching control unit, applied to sending the related information of the intelligent devices acting as a role of Capture to the intelligent devices acting as a role of Player, if the intelligent devices at the neighbor nodes have the intelligent device information stored, which acts as a role of Capture and matches the related data;

a negotiation control unit, applied to controlling the intelligent device acting as a role of Player use the information related to the data in the specific format of the intelligent device acting as a role of Capture to negotiate with the intelligent device acting as a role of Capture, and the data supplying application is sent out;

a data processing control unit, applied to controlling the intelligent device acting as a role of Player send data requests to the intelligent device acting as a role of Capture, as well as the proof requested by the intelligent device acting as a role of Capture, which will be processed after data received.

The method and system for self-adaptive pairing communication between intelligent devices as provided in the present invention, provides a communication method between a plurality of devices. Manual recognition and pairing between different devices is no more required, as long as the devices support at least one transmission protocol, they may pair in a self-adaptive mode, composing a simple but effective virtual network. The devices are divided into two types, a type of Capture and a type of Player, each type of device will send a plurality of messages to all neighbor nodes connecting to the said device through a specific transmission protocol, after connecting into the network. While the neighbor nodes will make a second propagation to their own neighbor nodes after receiving the messages, and keep repeating. The nodes will store the messages after receiving them. When a device is obtaining or processing data, based on the pre-stored messages, the data may be transmitted in a simple but rapid way. And, the operation is simple, the method and system are easy to implement, which has brought great convenience to users.

DETAILED DESCRIPTION OF EMBODIMENTS

In order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
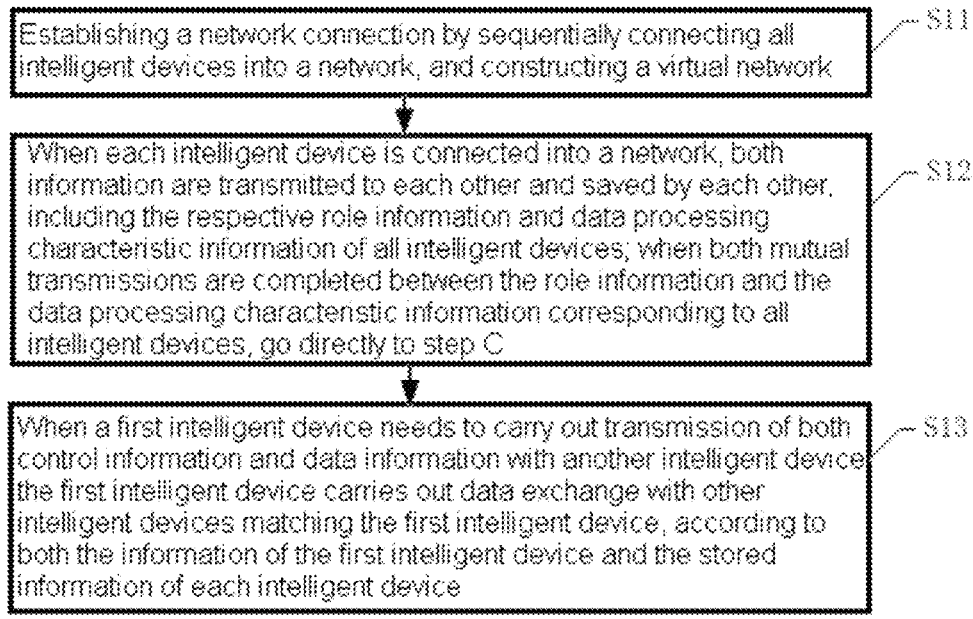
FIG. 1 illustrates a flow chart on a first preferred embodiment of the method for self-adaptive pairing communication between intelligent devices, as provided in the present invention.

FIG. 1 illustrates a flow chart on a first preferred embodiment of the method for self-adaptive pairing communication between intelligent devices, as provided in the present invention, wherein, step S11, establishing a network connection by sequentially connecting all intelligent devices into a network, and constructing a virtual network;

step S12, when each intelligent device is connected into a network, both information are transmitted to each other and saved by each other, including the respective role information and data processing characteristic information of all intelligent devices; when both mutual transmissions are completed between the role information and the data processing characteristic information corresponding to all intelligent devices, go directly to step C;

in the present embodiment of the invention, the role information of an intelligent device at a neighbor node may be divided into two roles: a role of Capture (PC), applied to providing data source, and a role of Player (device for playing), applied to processing and consuming data. An intelligent device at a node will send two kinds of messages to its neighbor intelligent devices locating at the neighbor nodes of the said intelligent device: one is the role information, applied to notifying its neighbor nodes that it is a role of Capture or a role of Player; the other is the data processing characteristic information, which changes following the changes of roles.

Step S13, when a first intelligent device needs to carry out transmission of both control information and data information with another intelligent device, the first intelligent device carries out data exchange with other intelligent devices matching the first intelligent device, according to both the information of the first intelligent device and the stored information of each intelligent device.

Further detailed descriptions of the present invention are stated below, combing with the specific embodiments.

Figure 2:
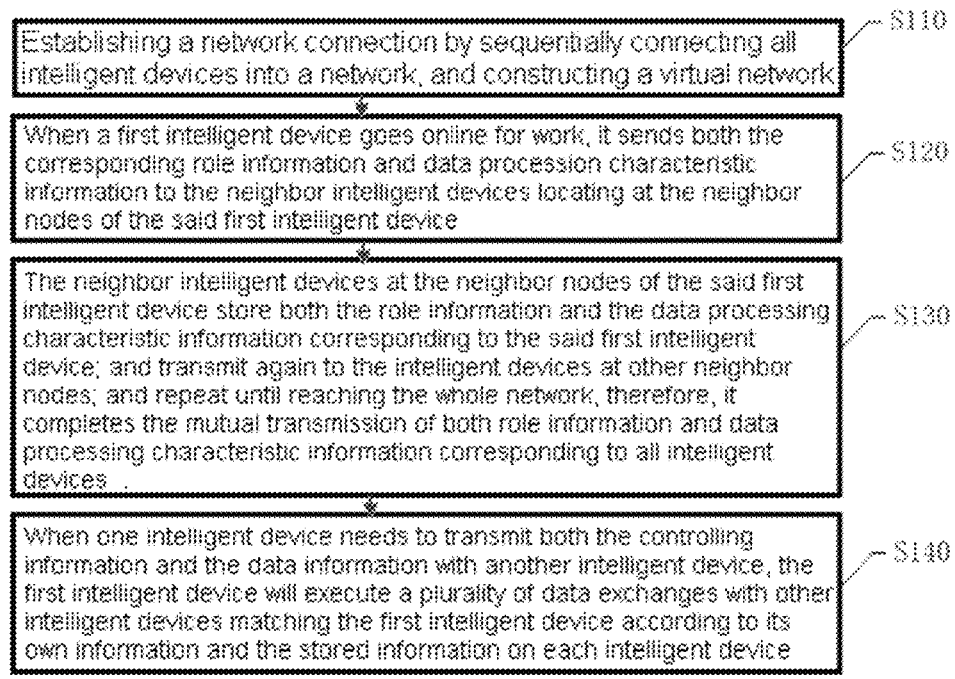
FIG. 2 illustrates a flow chart on a second preferred embodiment of the method for self-adaptive pairing communication between intelligent devices, as provided in the present invention.

Please referencing to FIG. 2, which is a flow chart of a second preferred embodiment of the method for self-adaptive pairing communication between intelligent devices, as provided in the present invention. The method for self-adaptive pairing communication between intelligent devices shown in FIG. 2 comprises:

step S110, establishing a network connection by sequentially connecting all intelligent devices into a network, and constructing a virtual network.

Figure 3:
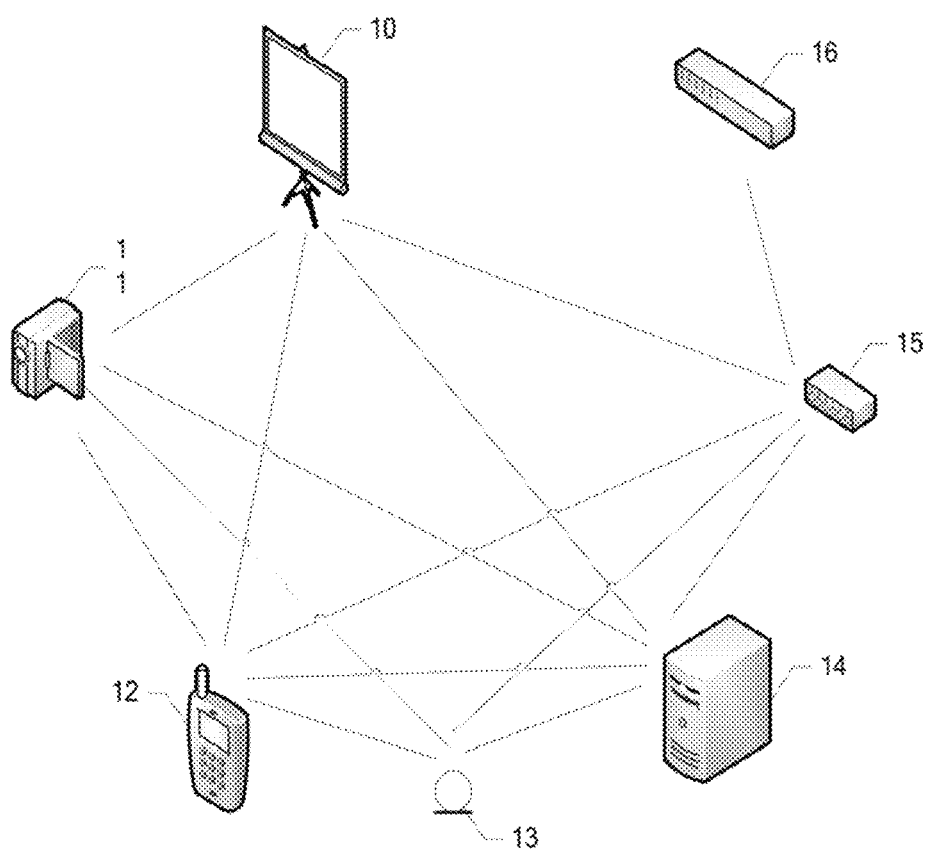
FIG. 3 illustrates a schematic diagram on the second preferred embodiment of the method for self-adaptive pairing communication between intelligent devices, as provided in the present invention.

As shown in FIG. 3, a TV 10, a DV 11, a Phone 12, an Earphone 13, a Stereo 14, an Infrared remoter 15 and an AC 16 are sequentially connected, before establishing a network connection.

In the present embodiment of the invention, all intelligent devices being able to attend the self-adaptive pairing may support at least one of the communication protocols of IP, Bluetooth, ZIGBEE and more, connections between any devices may be established freely, for example: IP Routing, WIFI Direct, Bluetooth Pairing, ZIGBEE Gateway and else. All devices form a simple but effective Ad hoc virtual network, while each device represents a node in the network. A device connecting to a specific device on a transport layer is called a neighbor device of the specific device. Nodes on different transport layers may support real-time data transmission through a proxy, a gateway, a network bridge or other software/hardware.

Step S120, when a first intelligent device goes online for work, it sends both the corresponding role information and data procession characteristic information to the neighbor intelligent devices locating at the neighbor nodes of the said first intelligent device.

Figure 4:
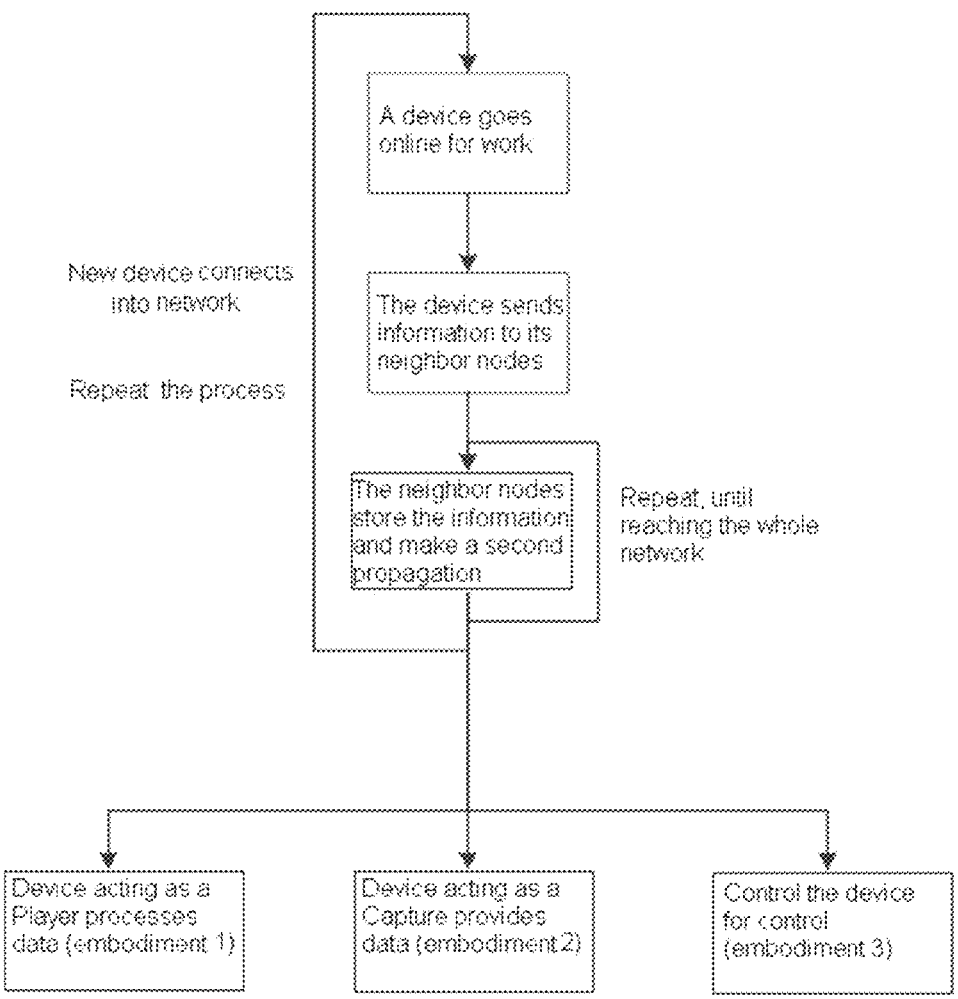
FIG. 4 illustrates a flow chart on a third preferred embodiment of the method for self-adaptive pairing communication between intelligent devices, as provided in the present invention.

During specific implementations of the present invention, referencing to FIG. 4, each new device connecting to the network needs to repeat a process, that is: when a new intelligent device goes online for work, it sends information to its neighbor nodes (that is, sending the corresponding role information and data procession characteristic information), then, the neighbor nodes will store the information, and execute a second transmission, before turning to step S130, propagations are kept until the whole network is reached.

In the embodiments of the present invention, the role information according to a neighbor intelligent device at a node may be divided into two roles: a role of Capture (PC), applied to providing data source, and a role of Player (device for playing), applied to processing and consuming data.

Wherein, the role of Capture is in charge of providing a data source, which is generated in three ways, 1), independently produced data, typical devices include: a camcorder/camera, a sensor; 2), a data storage medium, typical devices include: a streaming media server, a SD card; 3) a plurality of data processing and transferring processes, typical devices include: a PC, a cell phone and a TV.

A special intelligent device such as a cell phone, may possess all the above mentioned data sources, for example, a cell phone may take a photo or a video, thus it has a source of "independently produced data", a cell phone may also store pictures copied from a PC, thus it has a source of "a data storage medium", additionally, a cell phone may receive videos or pictures in a real time, before forwarding to other cell phones or an electric photo frame, thus it has a source function of "a plurality of data processing and forwarding processes".

A Player is in charge of processing and consuming data, a typical device includes: a cell phone, a TV, an earphone, a stereo, an electric photo frame and else. Wherein, those devices supporting a plurality of transmission agreements, such as a cell phone and a TV, may act as both a role of Capture and a role of Player at the same time, since they may play videos or audios, may also forward voices to devices including earphones and stereos having Bluetooth function.

The intelligent devices at a node may spread two kinds of messages to its neighbor nodes, one is the role information, applied to notifying its neighbor nodes that it is a role of Capture or a role of Player. The other is the data processing characteristic information, which is different according to different roles.

When the said first intelligent device is a role of Capture, applied to providing data source, it sends to the neighbor intelligent devices at neighbor nodes both the data source for data formats and the data processing characteristic information on data requesting condition, that is, if the first intelligent device is acting as a role of Capture, it will tell its neighbor nodes: "what data do I have" and "what condition is needed when requesting data from me".

When the said first intelligent device is acting as a role of Player, applied to processing and consuming data, it sends a data processing characteristic information to the neighbor intelligent devices at neighbor nodes, including a request of data source for data formats and a data processing method, that is, if it is a role of Player, it tells its neighbor nodes: "what data do I need", and for a specific kind of data, it further tells its neighbor nodes: "how will I process the data".

Step S130, the neighbor intelligent devices at the neighbor nodes of the said first intelligent device store both the role information and the data processing characteristic information corresponding to the said first intelligent device; and transmit again to the intelligent devices at other neighbor nodes; and repeat until reaching the whole network, therefore, it completes the mutual transmission of both role information and data processing characteristic information corresponding to all intelligent devices.

In the present embodiment of the invention, if a neighbor node of the said first intelligent device executes a storage action after receiving these information (if it has any storage media), meanwhile, these information are further transmitted to other neighbor nodes of the said neighbor node (if it has) (a second transmission), all nodes receiving these information will save the information (if they have any storage media).

For example, a camera is a role of Capture, it tells its neighbor nodes: "I have video streams" and "I need you provide me XX proof"; a TV is a role of Player, it tells its neighbor nodes: "I need video streams/pictures", and according to "video streams", it further tells its neighbor nodes "I am using it in such a way: h264 decoding/playing/pausing/fast forwarding/fast rewinding/volume controlling/pausing . . . ".

And it is repeated sequentially, until the whole network is reached, and it completes the mutual transmission of both the role information and the data processing characteristic information corresponding to all the intelligent devices.

Of course, there is another case that, as long as an intelligent device goes online, it mutually transmits and stores both role information and data processing characteristic information, when a device starts to work, it communicates and enters step S140 directly, without providing its role information, and this may accelerate the speed of connection.

Step S140, when one intelligent device needs to transmit both the controlling information and the data information with another intelligent device, the first intelligent device will execute a plurality of data exchanges with other intelligent devices matching the first intelligent device according to its own information and the stored information on each intelligent device.

In the present embodiment of the invention, both the intelligent devices acting as a role of Capture and the intelligent devices acting as a role of Player may provide or request data actively or passively.

When an intelligent device acting as a role of Capture is preparing to provide data actively, it sends devices at its neighbor nodes a request asking who may use this kind of data; if a neighbor node has stored the information matching this kind of data on an intelligent device acting as a role of Player, it will send the intelligent devices acting as a role of Capture the information related to the intelligent devices acting as a role of Player; while the intelligent devices acting as a role of Capture use these information to negotiate with those acting as a role of Player, then send out a data supplying application.

If an intelligent device at a neighbor node can not find the related information on intelligent devices acting as a role of Player, it will keep sending requests to other neighbor nodes, until all nodes are reached. Finally, the intelligent device acting as a role of Capture will send the intelligent device acting as a role of Player a data supplying notice and keep data sending. The intelligent device acting as a role of Player will process the data based on its own data procession actions.

When an intelligent device acting as a role of Player wants to actively use some data in a certain format, the intelligent device acting as a role of Player will send intelligent devices at its neighbor nodes a request asking who has this specific format of data, if an intelligent device at a neighbor node has stored the information matching this specific format of data on intelligent device acting as a role of Capture, it will send these information related to the intelligent device acting as a role of Capture to the intelligent device acting as a role of Player, and the intelligent device acting as a role of Player will use these information to negotiate with the intelligent device acting as a role of Capture, and send out a data request application, after that, the intelligent device acting as a role of Player will send a data request to that acting as a role of Capture, together with a proof requested by the intelligent device acting as a role of Capture, and the data will be processed after being received.

Based on the above described implementations, detailed embodiments are provided below to make a further detailed analysis to the present invention.

Take FIG. 3 as an example, there are 7 devices in a network, the communication agreements they support are listed in the following table:

| TV 10 | DV 11 | Cell phone12 | Earphone 13 | Stereo 14 | AC 16 | Infrared remoter 15 |
|---|---|---|---|---|---|---|
| Bluetooth/ Wifi/Lan/Infrared reception | Bluetooth | Bluetooth/ Wifi/Lan | Bluetooth | Bluetooth/ Wifi | RA | Wifi/infrared transmission |

Protocols including Bluetooth/Wifi/Lan may exchange data in both directions, and two devices may connect each other as long as both are supporting the same protocol. However, for an infrared protocol, which supports a uni-directional data transmission agreement only, thus a device with infrared reception ability may only connect to that having an infrared transmission ability.

According to the communication protocols they support, they are connected into a virtual network, some devices such as a TV, may communicate with all other devices, while other devices may communicate with some devices only.

Take a TV as an example, when a TV 10 starts to work, it sends its neighbor nodes (all devices in the network) messages telling them "I can act as both roles of Capture and Player; I have 'video streams, audio streams, pictures and music', I need you provide 'XX' proof; I need 'video streams, audio streams, pictures and music', I am using a video stream in this way: h264 decoding/playing/pausing/fast forwarding/fast rewinding/volume controlling/pausing . . . , I am using an audio stream in this way: playing/pausing . . . ".

The neighbor nodes will store these information after receiving (if they have storage media), meanwhile, these information will be further transmitted to other neighbor nodes of the said neighbor nodes (if they have), all nodes received these information will store these information (if they have storage media).

Take an AC as an example, an AC has an infrared reception function only; it may communicate with an infrared remote at its neighbor node in a uni-directional way, that is, it can only receive the information sent from the infrared remote, and can not send its own information to a phone at its neighbor node. When an infrared remote starts to work, it tells its neighbor nodes the information on the role its acts and its data processing characters, for example, "I am acting as a role of Player, I may control an infrared device, I need data for control, I am using the controlling data in this way: controlling an AC on/off/heat/cool/of modes/of winds . . . ".

Several embodiments are described below, for a further explanation to the present invention, referencing to FIG. 4:

A first embodiment: taking a TV playing a video stream for an example, referencing to FIG. 2, it includes the following steps:

1. When a TV wants to play a video stream, it will send out requests and ask who has any video stream data, then according to the stored neighbor nodes information, it will check the network for nodes being able to produce or store video data, that is, being able to act as a role of Capture, and find two nodes including a DV and a Phone; (that is, when a first intelligent device needs to carry out transmission of both control information and data information with another intelligent device, the first intelligent device will automatically check the role information and the data processing characteristic information corresponding to the said first intelligent device).

2. The TV shows all the received content information on the screen of the device at the node acting as a role of Capture for the user to select a video stream data in one device to play, for example, now the user is interested in a video stream in the DV, an operation instruction on user selection of playing a video stream on a DV may be received through the said TV. (Steps on user's selection may be neglected, the TV may automatically select a playing device for a better playing effect according to the information, and now those information supplied to a TV for automatically selection will be contained in the nodes information).

3. The TV finds in the stored information that, playing a DV video stream requires a user's proof, 4. The TV sends a data request to the DV, together with the proof needed: a user ID and password.

5. The DV confirms the proof is correct, before sending the video stream data to the TV.

6. The TV receives the video stream data, and finally executes the following processing actions to the video stream: XX decoding/playing/pausing/fast forwarding . . . and so on.

A second embodiment: methods of the second embodiment: when a TV is playing a video stream, it is considered that the TV's voice effect is not perfect, and using a more professional audio player to play the voice is preferred, following steps will be taken:

1) The TV will send out requests and ask who may deal with audio data, based on both the stored neighbor nodes information and other devices information sent by the neighbor nodes, it may find the following devices at nodes may deal with audio data and act as a role of Player: Earphone and Stereo (that is, when a first intelligent device needs to carry out transmission of both control information and data information with another intelligent device, the first intelligent device will automatically check both the role information and the data processing characteristic information corresponding to the said first intelligent device).

2) The TV lists the information of devices acting as a Player in a table and shows on the interface, for a user to select.

3) The TV receives a user's operation instruction on selecting a Stereo to play the audio. (Steps on user's selection may be neglected, it may be automatically selected by the TV for a better playing effect, according to the information, now the nodes information need contain those information supplied to TV for automatically selection).

4) The TV sends a data supplying notice to the stereo, followed by continuously sending audio data to the Stereo.

A third embodiment: when a Phone is needed to control an AC, however, the Phone itself does not support an infrared agreement, thus it may not communicate with the AC directly. However, the present invention may achieve controlling the AC through intelligently pairing with a transition device, that is, an infrared remote. It comprises the following steps:

1. The Phone automatically checks both the role information and the data processing characteristic information corresponding to a phone, for example, checking through the phone for who may control an AC, and through the stored information, it finds an infrared remote may control an AC.

2. The Phone checks the method of using an infrared remote to control an AC, that is, how to control an AC by using the controlling data.

3. The Phone sends out an instruction, and transmits the controlling data to an infrared remote.

4. The infrared remote receives the controlling data and controls the AC.

All above, the present invention provides a method for self-adaptive pairing communication between intelligent devices. According to the present invention, a bridge can be set up rapidly, simply and efficiently between the intelligent devices, all the intelligent devices can be paired in a self-adaptive mode, achieving interconnections and interactions. Also, the operation is simple, the method and system is easy to implement, and great convenience is brought to users.

Figure 5:
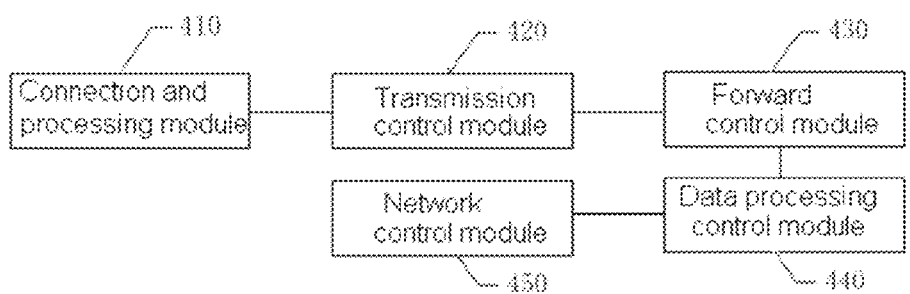
FIG. 5 illustrates a block diagram on functions and principles of a preferred embodiment of the method for self-adaptive pairing communication between intelligent devices, as provided in the present invention.

According to the above stated embodiments on the methods, the present invention further provides embodiments on the system for self-adaptive pairing communication between intelligent devices, as shown in FIG. 5, the said system for self-adaptive pairing communication between intelligent devices, comprises:

a connection and processing module 410, applied to sequentially connecting each intelligent device into a network and setting up a network connection, before building up a virtue network; details have been stated above.

A transmission control module 420, applied to controlling sending both the corresponding role information and data processing characteristic information to the neighbor intelligent devices locating at the neighbor nodes of the said first intelligent device; details have been stated above.

a forward control module 430, applied to controlling the neighbor intelligent devices at the neighbor nodes of the said first intelligent device store both the role information and the data processing characteristic information corresponding to the said first intelligent device; and transmit again to the intelligent devices at other neighbor nodes; and it is repeated until reaching the whole network, and the mutual transmission of both the role information and the data processing characteristic information corresponding to all intelligent devices are then completed; details have been stated above.

a data processing control module 440, applied to controlling the first intelligent device execute data exchanges with other intelligent devices matching the first intelligent device according to its own information and the stored information on each intelligent device, when the said first intelligent device needs to transmit both the controlling information and the data information with another intelligent device; details have been stated above.

a network control module 450, applied to mutually transmitting the respective roles information and data processing characteristic information before saving, when each intelligent device is connected into a network.

The said system for self-adaptive pairing communication between intelligent devices, wherein, The said sending control module comprises:

a first sending unit, applied to sending two kinds of messages to the neighbor intelligent devices locating at the neighbor nodes of the said first intelligent device, when a first intelligent device goes online for work: one is the role information, applied to notifying its neighbor nodes that it is a role of Capture or a role of Player; the other is the data processing characteristic information, which changes following the changes of roles; details have been stated above.

a second sending unit, applied to sending to the neighbor intelligent devices at neighbor nodes both a data source for data formats and a data processing characteristic information on a data requesting condition, when the said first intelligent device is acting as a role of Capture, applied to providing data sources; and when the said first intelligent device is acting as a role of Player, applied to processing and consuming data, it sends to the neighbor intelligent devices at neighbor nodes, both a request on data source for data formats and a data processing characteristic information on data processing method; details have been stated above.

The said forward control module includes specifically:

an obtaining and storage unit, applied for the neighbor nodes of the said first intelligent device to obtaining both the role information and data processing characteristic information corresponding to the said first intelligent device before storing; details have been stated above.

a transmission control unit, applied to transmitting both the role information and data processing characteristic information corresponding to the said first intelligent device to the intelligent devices at other neighbor nodes, or a second propagation to the intelligent devices at other neighbor nodes, while all nodes receiving these information will store the information; the process is repeated sequentially, up to the whole network, and the mutual transmission of both role information and data processing characteristic information corresponding to all intelligent devices is completed; details have been stated above.

the said intelligent devices support at least one of the transmission agreements including IP, Bluetooth, ZIGBEE;

the said role information includes: a role of Capture, applied to providing data source, and a role of Player, applied to processing and consuming data.

The said self-adaptive paring communication system between intelligent devices, wherein, the said data processing control module comprises specifically:

a first request control unit, applied to sending requests to devices at neighbor nodes asking who may use this kind of data, when an intelligent device acting as a role of Capture are actively providing data; details have been stated above.

a first matching control unit, applied to sending the related information of the intelligent device acting as a role of Player to those acting as a role of Capture, when the neighbor nodes have the information of intelligent devices acting as a role of Player stored, which matches the related data; and the intelligent devices acting as a role of Capture use these information to negotiate with those intelligent devices acting as a role of Player, then, the data supplying application is sent out; details have been stated above.

a second request control unit, applied to controlling the intelligent devices at neighbor nodes continue sending request messages to other neighbor nodes up to all nodes, if there is no related information found on intelligent device acting as a role of Player; details have been stated above.

a notice sending control unit, applied to controlling the intelligent device acting as a role of Capture send data supplying notice to that acting as a role of Player and continue data sending; and the intelligent device acting as a role of Player makes data processes according to its own data processing actions; details have been stated above.

a third request control unit, applied for the intelligent device acting as a role of Player to sending to the intelligent devices at its neighbor nodes a request on who having the data in the specific format, when the intelligent device acting as a role of Player is actively using a specific format of data; details have been stated above.

a first matching control unit, applied to sending to the intelligent devices acting as a role of Player the related information of the intelligent devices acting as a role of Capture, if the intelligent devices at the neighbor nodes have stored the information matching the related data, on intelligent devices acting as a role of Capture; details have been stated above.

a negotiation control unit, applied to controlling the intelligent device acting as a role of Player use the information related to the data in the said specific format on the intelligent device acting as a role of Capture, to negotiate with the intelligent device acting as a role of Capture, and a data request application is sent out; details have been stated above.

a data processing control unit, applied to controlling the intelligent device acting as a role of Player send data requests to the intelligent device acting as a role of Capture, as well as the proof requested by the intelligent device acting as a role of Capture, which will be processed after being received. Details have been stated above. All above, the method and system for self-adaptive pairing communication between intelligent devices as provided in the present invention, provides a communication method between a plurality of devices. Manual recognition and pairing between different devices is no more required, as long as the devices support at least one transmission protocol, they may pair in a self-adaptive mode, and compose a simple but effective virtual network. The devices are divided into two types, a type of Capture and a type of Player, after each type of devices is connected into the network, messages will be sent to all neighbor nodes connecting to the said device through a specific transmission agreement. While the neighbor nodes will make a second propagation to their own neighbor nodes after receiving the messages, and keep repeating. The nodes will store the messages after receiving. When a device is obtaining or processing data, according to the pre-stored messages, the data may be transmitted in a simple but rapid way. And, the operation is simple, the method and system is easy to implement, and great convenience has been brought to users.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A method for self-adaptive pairing communication between a plurality of intelligent devices, comprising:
    A, establishing a network connection by sequentially connecting the plurality of intelligent devices into a network, and constructing a virtual network;
    B, when a first intelligent device and a second intelligent device are connected into the network, an information of the first intelligent device and an information of the second intelligent device are transmitted to each other and saved by each other, including a role information and a data processing characteristic information of all the intelligent devices; when a mutual transmission between the role information and the data processing characteristic information corresponding to the plurality of intelligent devices is completed, go directly to step C;
    C, when the first intelligent device needs to carry out transmission of a control information and a data information with the second intelligent device, the first intelligent device carries out a data exchange with the second intelligent device matching the first intelligent device, according to the information of the first intelligent device and the information of the second intelligent device.

2. The method for self-adaptive pairing communication between the plurality of intelligent devices according to claim 1, wherein, the role information in the step B comprises:
    a role of Capture, applied to providing a data, and a role of Player, applied to processing and consuming the data;
    wherein, the first intelligent device supports at least one communication protocols of IP, Bluetooth and ZIGBEE.

3. The method for self-adaptive pairing communication between the plurality of intelligent devices according to claim 1, wherein, the step C comprises:
    C11. when the first intelligent device acting as a role of Capture is actively providing a data, the first intelligent device sends out a request to devices at neighbor nodes of the first intelligent device and asks who may use the data;
    C12, if the neighbor nodes have stored the data of information on the second intelligent device acting as a role of Player, matching a specific format of data, then the information of the second intelligent device acting as the role of Player is sent to the first intelligent device acting as the role of Capture; the information is used by the first intelligent device acting as the role of Capture to negotiate with the second intelligent device acting as the role of Player, and a data supplying application is sent out;
    C13, when the first intelligent device at the neighbor nodes have not found the information on the second intelligent device acting as the role of Player, the first intelligent device continues sending request messages to other neighbor nodes, up to all nodes;
    C14, the first intelligent device acting as the role of Capture sends a data supplying notice to the second intelligent device acting as the role of Player, and continues data sending; while the second intelligent device acting as the role of Player processes the data according to data processing actions.

4. The method for self-adaptive pairing communication between the plurality of intelligent devices according to claim 1, wherein, the step C further comprises:

C21, when the first intelligent device acting as a role of Player are actively using a data in a specific format, the first intelligent device sends out requests asking who has the data in the specific format to the second intelligent device at neighbor nodes;

C22, if the second intelligent device at the neighbor nodes has stored the information matching the data on the second intelligent device acting as a role of Capture, then the information of the second intelligent device acting as the role of Capture is sent to the first intelligent device acting as the role of Player;

C23, the first intelligent device acting as the role of Player uses the information related to the specific format of data on the second intelligent device acting as the role of Capture to negotiate with the second intelligent device acting as the role of Capture, and a data request is sent out;

C24, the first intelligent device acting as the role of Player sends the second intelligent device acting as the role of Capture the data request as well as a proof requested by the second intelligent device acting as the role of Capture, which is processed after being received.

5. A method for self-adaptive pairing communication between a plurality of intelligent devices, comprising:

A, establishing a network connection by sequentially connecting the plurality of intelligent devices into a network, and constructing a virtual network;

B, when a first intelligent device and a second intelligent device are connected into the network, an information of the first intelligent device and an information of the second intelligent device are transmitted to each other and saved by each other, including a role information and a data processing characteristic information of all intelligent devices; when a mutual transmission between the role information and the data processing characteristic information corresponding to the plurality of intelligent devices is completed, go directly to step C;

C, when the first intelligent device needs to carry out transmission of a control information and a data information with the second intelligent device, the first intelligent device carries out a data exchange with the second intelligent device matching the first intelligent device, according to the information of the first intelligent device and the information of the second intelligent device;

the step B further comprising:

B1, when the first intelligent device goes online for work, the first intelligent device sends the role information and the data processing characteristic information to neighbor intelligent devices locating at the neighbor nodes of the first intelligent device;

B2, the neighbor intelligent devices locating at the neighbor nodes of the first intelligent device save the role information and the data processing characteristic information corresponding to the first intelligent device; then transmit to the plurality of intelligent devices at other neighbor nodes for a second time; and repeat again, until reaching a whole network, completing a mutual transmission of the role information and the data processing characteristic information corresponding to the plurality of intelligent devices.

6. The method for self-adaptive pairing communication between the plurality of intelligent devices according to claim 5, wherein, the step B1 comprises:

B11, when the first intelligent device goes online for work, the first intelligent device sends two kinds of messages to the neighbor intelligent devices locating at the neighbor nodes of the first intelligent device: one is the role information, applied to notifying the neighbor nodes that it is a role of Capture or a role of Player; the other is the data processing characteristic information, which changes following the changes of roles;

B12. when the first intelligent device is acting as the role of Capture, applied to providing a data, the first intelligent device sends the data processing characteristic information to the neighbor intelligent devices at the neighbor nodes, including the data for a data format and a data requesting condition;

when the first intelligent device is acting as the role of Player, applied to processing and consuming the data, the first intelligent device sends the data processing characteristic information to the neighbor intelligent devices at the neighbor nodes, including a request of the data for the data format and a data processing method.

7. The method for self-adaptive pairing communication between the plurality of intelligent devices according to claim 6, wherein, the step B2 comprises:

B21. the neighbor nodes of the first intelligent device obtain the role information and the data processing characteristic information before storing;

B22. at a same time, transferring to other neighbor nodes both the role information and the data processing characteristic information corresponding to the first intelligent device, executing a second transmitting to the plurality of intelligent devices at other neighbor nodes, and all nodes receiving the information will store the information;

B23. repeating sequentially until reaching the whole network, then completing the mutual transmission of both the role information and the data processing characteristic information corresponding to the plurality of intelligent devices.

8. The method for self-adaptive pairing communication between the plurality of intelligent devices according to claim 7, wherein, the step C comprises:

C11. when the first intelligent device acting as the role of Capture is actively providing a data, the first intelligent device sends a request to devices at neighbor nodes of the first intelligent device asking who may use the data;

C12. if the neighbor nodes have stored the information on the second intelligent device acting as the role of Player, and matches the data, the neighbor nodes send the information of the second intelligent devices acting as the role of Player to the first intelligent device acting as the role of Capture; the first intelligent device acting as the role of Capture uses the information to negotiate with the second intelligent device acting as the role of Player, and send out a data supplying application;

C13, when the first intelligent device at the neighbor node has not found the information on the second intelligent device acting as the role of Player, the first intelligent device continues sending request messages to other neighbor nodes, up to all the nodes;

C14, the first intelligent device acting as the role of Capture will send a data supplying notice to the second intelligent device acting as the role of Player, and continue data sending; while the second intelligent device acting as the role of Player will process the data according to data processing actions.

9. The method for self-adaptive pairing communication between the plurality of intelligent devices according to claim 7, wherein, the step C further comprises:

C21, when the first intelligent device acting as the role of Player is actively using a data in a specific format, the first intelligent device sends out requests to the second intelligent device at neighbor nodes, asking who has the data in the specific format;

C22, if the second intelligent device at a neighbor node has the information stored on the second intelligent device acting as the role of Capture and matching the data, then the second intelligent device sends the information of the second intelligent device acting as the role of Capture to the first intelligent device acting as the role of Player;

C23, the first intelligent device acting as the role of Player uses the information of the second intelligent device acting as the role of Capture related to the data in the specific format to negotiate with the second intelligent device acting as the role of Capture, and sends out a data request;

C24, the first intelligent device acting as the role of Player will send the second intelligent device acting as the role of Capture the data request as well as a proof requested by the second intelligent device acting as the role of Capture, which will be processed after data received.

10. The method for self-adaptive pairing communication between the plurality of intelligent devices according to claim 5, wherein, the step B2 comprises:

B21. the neighbor nodes of the first intelligent device obtain the role information and the data processing characteristic information before storing;

B22. at a same time, transferring to other neighbor nodes both the role information and the data processing characteristic information corresponding to the first intelligent device, executing a second transmitting to the plurality of intelligent devices at other neighbor nodes, and all nodes receiving the role information and the data processing characteristic information will store the information;

B23. repeating sequentially until reaching the whole network, then completing the mutual transmission of the role information and the data processing characteristic information corresponding to the plurality of intelligent devices.

11. The method for self-adaptive pairing communication between the plurality of intelligent devices according to claim 5, wherein, the step C comprises:

C11. when the first intelligent device acting as a role of Capture is actively providing a data, the first intelligent device sends a request to devices at neighbor nodes of the first intelligent device asking who may use the data;

C12. if the neighbor nodes have stored the information on the second intelligent device acting as a role of Player and matches the data, then the information of the second intelligent device acting as the role of Player is sent to those acting as the role of Capture; the intelligent devices acting as the role of Capture use these information to negotiate with those intelligent devices acting as the role of Player, and send out a data supplying application;

C13, when the first intelligent device at the neighbor node has not found the information on the second intelligent device acting as the role of Player, the first intelligent device continues sending request messages to other neighbor nodes, up to all nodes; and C14, the first intelligent device acting as the role of Capture will send a data supplying notice to the second intelligent device acting as the role of Player, and continue data sending; while the second intelligent device acting as the role of Player will process the data according to data processing actions.

12. The method for self-adaptive pairing communication between the plurality of intelligent devices according to claim 5, wherein, the step C further comprises:

C21, when the first intelligent device acting as a role of Player is actively using a data in a specific format, the first intelligent device sends out requests to the second intelligent device at neighbor nodes, asking who has the data in the specific format;

C22, if the second intelligent device at a neighbor node has the information stored on the second intelligent device acting as a role of Capture and matching the data, then the second intelligent device sends the information of the second intelligent device acting as the role of Capture to the first intelligent device acting as the role of Player;

C23, the first intelligent device acting as the role of Player uses the information of the second intelligent device acting as the role of Capture related to the data in the specific format to negotiate with the second intelligent device acting as the role of Capture, and sends out a data request; and C24, the first intelligent device acting as the role of Player will send the second intelligent device acting as the role of Capture the data request as well as a proof requested by the second intelligent device acting as the role of Capture, which will be processed after data received.

13. A self-adaptive paring communication system between a plurality of intelligent devices, comprising:

a processor;

a memory coupled to the processor; and a plurality of program modules stored in the memory to be executed by the processor, the plurality of program modules comprising:

a connection and processing module, applied to sequentially connecting a first intelligent device and a second intelligent device into a network and setting up a network connection, before building up a virtue network;

a network control module, applied to mutually transmitting a role information and a data processing characteristic information before saving, when each intelligent device is connected into the network, until a mutual transmission of both the role information and the data processing characteristic information corresponding to all the plurality of intelligent devices is completed;

a data processing control module, applied to controlling the first intelligent device execute data exchanges with the second intelligent device matching the first intelligent device according to an information of the first intelligent device and an information of the second intelligent device, when the first intelligent device needs to transmit a controlling information and a data information with the second intelligent device;

a transmission control module, applied to controlling sending both the role information and the data processing characteristic information to neighbor intelligent devices at the neighbor nodes of the first intelligent device;

a forward control module, applied to controlling the neighbor intelligent devices at the neighbor nodes of the first intelligent device store both the role information and the data processing characteristic information corresponding to the first intelligent device; and transmit in a second time to the plurality of intelligent devices at other neighbor nodes; and repeat until reaching a whole network, then the forward control module completes the mutual transmission of both the role information and the data processing characteristic information corresponding to all the plurality of intelligent devices.

14. The self-adaptive paring communication system between the plurality of intelligent devices according to claim 13, wherein, the sending control module comprises:

a first sending unit, applied to sending two kinds of messages to the neighbor intelligent devices locating at the neighbor nodes of the first intelligent device, when the first intelligent device goes online for work: one is the role information, applied to notifying the neighbor nodes of the first intelligent device that it is a role of Capture or a role of Player; the other is the data processing characteristic information, which changes according to role changes;

a second sending unit, applied to sending the data processing characteristic information to the neighbor intelligent devices at neighbor nodes, including a data for data formats and a data requesting condition, when the first intelligent device is acting as the role of Capture, applied to providing the data; and when the first intelligent device is acting as the role of Player, applied to processing and consuming the data, the first intelligent device sends out the data processing characteristic information to the neighbor intelligent devices at neighbor nodes, including a request on data source formats and a data processing method;

the forward control module includes:

an obtaining and storage unit, applied for the neighbor nodes of the first intelligent device to obtaining the role information and the data processing characteristic information corresponding to the first intelligent device before storing;

a transmission control unit, applied to transmitting the role information and the data processing characteristic information corresponding to the first intelligent device to the plurality of intelligent devices at other neighbor nodes, or a second propagation to the plurality of intelligent devices at other neighbor nodes, while all nodes receiving the information will store the information; and repeating sequentially, until reaching the whole network, and finally completing the mutual transmission of both the role information and the data processing characteristic information corresponding to all the plurality of intelligent devices;

the plurality of intelligent devices support at least one of the transmission agreements including IP, Bluetooth, ZIGBEE;

the role information includes: a role of Capture, applied to providing the data, and a role of Player, applied to processing and consuming the data.

15. The self-adaptive paring communication system between the plurality of intelligent devices according to claim 13, wherein, the data processing control module comprises:

a first request control unit, applied to sending requests to devices at neighbor nodes asking whom may use this kind of data, when the first intelligent device acting as a role of Capture is preparing to actively provide the data;

a first matching control unit, applied to sending the information of the second intelligent device acting as a role of Player to the first intelligent device acting as the role of Capture, when the neighbor nodes have an intelligent device information stored, which acts as the role of Player and matches the data; and the first intelligent device acting as the role of Capture uses the information to negotiate with the second intelligent device acting as the role of Player, and sends out the data supplying application;

a second request control unit, applied to controlling the plurality of intelligent devices at neighbor nodes continue sending request messages to other neighbor nodes up to all nodes, if there is no intelligent device related information found acting as the role of Player;

a notice sending control unit, applied to control the first intelligent device acting as the role of Capture send data supplying notice to that acting as the role of Player and continue data sending; while the second intelligent device acting as the role of Player processes data based on data processing actions;

a third request control unit, applied for the second intelligent device acting as the role of Player to sending a request to the plurality of intelligent devices at its neighbor nodes, asking whom having the data in the specific format, when the second intelligent device acting as the role of Player is preparing to actively use a specific format of data;

a first matching control unit, applied to sending the information of the first intelligent devices acting as the role of Capture to the second intelligent device acting as the role of Player, if the plurality of intelligent devices at the neighbor nodes have the intelligent device information stored, which acts as the role of Capture and matches the related data;

a negotiation control unit, applied to controlling the second intelligent device acting as the role of Player uses the information related to the data in the specific format of the first intelligent device acting as the role of Capture to negotiate with the first intelligent device acting as the role of Capture, and the data supplying application is sent out;

a data processing control unit, applied to controlling the second intelligent device acting as the role of Player sends data requests to the first intelligent device acting as the role of Capture, as well as the proof requested by the first intelligent device acting as the role of Capture, which will be processed after data received.

* * * * *